(12) United States Patent
Williams

(10) Patent No.: US 8,308,422 B2
(45) Date of Patent: Nov. 13, 2012

(54) SUBMERGED HYDROELECTRIC TURBINES HAVING BUOYANCY CHAMBERS

(75) Inventor: Herbert Williams, East Palatka, FL (US)

(73) Assignee: OpenHydro Group Limited, Dublin (IE)

( * ) Notice: Subject to any disclaimer, the term of this patent is extended or adjusted under 35 U.S.C. 154(b) by 687 days.

(21) Appl. No.: 12/373,466

(22) PCT Filed: Jul. 13, 2007

(86) PCT No.: PCT/EP2007/006234
§ 371 (c)(1),
(2), (4) Date: Jun. 25, 2009

(87) PCT Pub. No.: WO2008/006601
PCT Pub. Date: Jan. 17, 2008

(65) Prior Publication Data
US 2010/0025998 A1    Feb. 4, 2010

(30) Foreign Application Priority Data

Jul. 14, 2006 (EP) .................................. 06014668

(51) Int. Cl.
*F03B 13/10* (2006.01)
(52) U.S. Cl. ............ 415/7; 416/84; 416/86; 416/DIG. 4
(58) Field of Classification Search .............. 415/7, 228, 415/906; 416/84, 85, 86, DIG. 4
See application file for complete search history.

(56) References Cited

U.S. PATENT DOCUMENTS

| | | | |
|---|---|---|---|
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 3,209,156 A | 9/1965 | Struble |
| 3,342,444 A | 9/1967 | Nelson |
| 3,355,998 A | 12/1967 | Roemisch |

(Continued)

FOREIGN PATENT DOCUMENTS

CA    2388513    4/2001

(Continued)

OTHER PUBLICATIONS

PCT International Search Report for International Application No. PCT/EP2007/006234 dated Sep. 3, 2007.

(Continued)

*Primary Examiner* — Edward Look
*Assistant Examiner* — Liam McDowell
(74) *Attorney, Agent, or Firm* — Gardner, Linn, Burkhart & Flory, LLP

(57) ABSTRACT

In a hydroelectric turbine having a rotor disposed within a stator housing, the rotor having an annular outer rim received by a channel in the stator housing, the improvement comprising a buoyant rotor, the rotor preferably having buoyancy chambers disposed within the rotor. The buoyancy chambers may be disposed within the annular outer rim, the blades or an annular inner rim, or combinations thereof. Preferably, the buoyancy chambers are filled with a material having a specific gravity of one or less, and most preferably the filler material is a polymer foam that adds rigidity to the rotor.

14 Claims, 6 Drawing Sheets

U.S. PATENT DOCUMENTS

| | | | |
|---|---|---|---|
| 3,422,275 | A | 1/1969 | Braikevitch et al. |
| 3,477,236 | A | 11/1969 | Burrus |
| 3,487,805 | A | 1/1970 | Satterthwaite et al. |
| 3,708,251 | A | 1/1973 | Pierro |
| 3,986,787 | A | 10/1976 | Mouton et al. |
| 3,987,638 | A | 10/1976 | Burkhardt et al. |
| 4,095,918 | A * | 6/1978 | Mouton et al. ............... 415/7 |
| 4,163,904 | A | 8/1979 | Skendrovic |
| 4,219,303 | A | 8/1980 | Mouton, Jr. et al. |
| 4,421,990 | A | 12/1983 | Heuss et al. |
| 4,427,897 | A | 1/1984 | Migliori |
| 4,523,878 | A | 6/1985 | Richart et al. |
| 4,541,367 | A | 9/1985 | Lindberg |
| 4,613,762 | A | 9/1986 | Soderholm |
| 4,720,640 | A | 1/1988 | Anderson et al. |
| 4,740,711 | A | 4/1988 | Sato et al. |
| 4,868,408 | A | 9/1989 | Hesh |
| 5,592,816 | A | 1/1997 | Williams |
| 6,109,863 | A | 8/2000 | Milliken |
| 6,168,373 | B1 | 1/2001 | Vauthier |
| 6,300,689 | B1 | 10/2001 | Smalser |
| 6,367,399 | B1 | 4/2002 | Khachaturian |
| 6,406,251 | B1 | 6/2002 | Vauthier |
| 6,409,466 | B1 | 6/2002 | Lamont |
| 6,476,709 | B1 | 11/2002 | Wuidart et al. |
| 6,648,589 | B2 | 11/2003 | Williams |
| RE38,336 | E | 12/2003 | Williams |
| 6,729,840 | B2 | 5/2004 | Williams |
| 6,806,586 | B2 * | 10/2004 | Wobben ............... 290/54 |
| 6,957,947 | B2 | 10/2005 | Williams |
| 7,190,087 | B2 | 3/2007 | Williams |
| D543,495 | S | 5/2007 | Williams |
| 7,352,078 | B2 | 4/2008 | Gehring |
| 7,425,772 | B2 * | 9/2008 | Novo Vidal ............... 290/52 |
| 7,471,009 | B2 | 12/2008 | Davis et al. |
| 7,874,788 | B2 * | 1/2011 | Stothers et al. ............... 415/4.5 |
| 2002/0034437 | A1 | 3/2002 | Williams |
| 2003/0044272 | A1 | 3/2003 | Addie et al. |
| 2003/0137149 | A1 | 7/2003 | Northrup et al. |
| 2003/0168864 | A1 | 9/2003 | Heronemus et al. |
| 2003/0193198 | A1 | 10/2003 | Wobben |
| 2003/0218338 | A1 | 11/2003 | O'Sullivan et al. |
| 2004/0021437 | A1 | 2/2004 | Maslov et al. |
| 2004/0201299 | A1 | 10/2004 | Naritomi et al. |
| 2004/0227500 | A1 | 11/2004 | O'Meara |
| 2004/0262926 | A1 | 12/2004 | Hansen |
| 2005/0005592 | A1 | 1/2005 | Fielder |
| 2005/0031442 | A1 | 2/2005 | Williams |
| 2006/0261597 | A1 | 11/2006 | Gehring |
| 2007/0018459 | A1 | 1/2007 | Williams |
| 2007/0063448 | A1 | 3/2007 | Kowalczyk |
| 2007/0291426 | A1 | 12/2007 | Kasunich et al. |
| 2008/0012538 | A1 | 1/2008 | Stewart et al. |
| 2009/0278357 | A1 | 11/2009 | Williams |
| 2010/0025998 | A1 | 2/2010 | Williams |
| 2010/0026002 | A1 | 2/2010 | Spooner |
| 2010/0068037 | A1 | 3/2010 | Ives |
| 2010/0172698 | A1 | 7/2010 | Ives et al. |
| 2010/0201129 | A1 | 8/2010 | Holstein et al. |
| 2010/0232885 | A1 | 9/2010 | Ives et al. |
| 2010/0295388 | A1 | 11/2010 | Ives et al. |
| 2011/0018274 | A1 | 1/2011 | Ives et al. |
| 2011/0088253 | A1 | 4/2011 | Ives et al. |
| 2011/0110770 | A1 | 5/2011 | Spooner et al. |
| 2011/0291419 | A1 | 12/2011 | Dunne et al. |
| 2011/0293399 | A1 | 12/2011 | Dunne et al. |
| 2011/0298216 | A1 | 12/2011 | Ives et al. |
| 2011/0304148 | A1 | 12/2011 | Dunne et al. |
| 2012/0027522 | A1 | 2/2012 | Ives et al. |

FOREIGN PATENT DOCUMENTS

| | | |
|---|---|---|
| CA | 2352673 | 1/2003 |
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | WO03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | WO2005080789 | 9/2005 |
| WO | 2005116443 | 12/2005 |
| WO | WO2006029496 | 3/2006 |
| WO | 2007043894 | 4/2007 |
| WO | 2007055585 | 5/2007 |
| WO | 2007083105 | 7/2007 |
| WO | 2007086814 | 8/2007 |

| | | |
|---|---|---|
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | 2010118766 A1 | 10/2010 |
| WO | 2011039249 | 4/2011 |
| WO | 2011039255 | 4/2011 |
| WO | 2011039267 | 7/2011 |

OTHER PUBLICATIONS

PCT Request for Processing of International Application.

PCT Written Opinion of the International Searching Authority (Mar. 9, 2007).

PCT International Preliminary Report on Patentability (Sep. 29, 2008) including copy of claims 1-10 as amended with demand for examination.

U.S. Appl. No. 13/133,235, filed Jun. 7, 2011, including the specification, claims and drawings.

U.S. Appl. No. 13/133,805, filed Jun. 9, 2011, including the specification, claims and drawings.

U.S. Appl. No. 13/133,504, filed Jun. 8, 2011, including the specification, claims and drawings.

U.S. Appl. No. 13/133,507, filed Jun. 8, 2011, including the specification, claims and drawings.

U.S. Appl. No. 13/133,832, filed Jun. 9, 2011, including the specification, claims and drawings.

U.S. Appl. No. 13/264,667, filed Oct. 14, 2011, including specification, claims and drawings.

* cited by examiner

SUBMERGED HYDROELECTRIC TURBINES HAVING BUOYANCY CHAMBERS

BACKGROUND OF THE INVENTION

This invention relates generally to the field of turbines or power plants that produce electricity by harnessing the flow of water, whether the flow is uni-directional, such as found in a river or oceanic currents, or bi-directional, such as a tidal flow, and more particularly relates to such devices wherein the fluid flow causes rotation of a large propeller-type rotor having an annular outer rim disposed within a large annular housing. Even more particularly, the invention relates to such devices wherein the turbine is submerged within the body of water.

Production of electricity using hydroelectric turbines is well known. Typically, turbines are mounted in dams such that controlled fluid flow causes rotation of a propeller-type rotor or blades. Such relatively rapid water flow conditions are known as high head conditions. It is also known to place turbines in low head conditions, such as produced by tidal flow in a bay, at the mouth of a river or offshore.

While most turbines are constructed to have a central rotating shaft onto which the blades or runners are mounted, it is also known to produce open-centered turbines, also known as rim-mounted turbines. Turbines having open-centered rotors, where the blades are mounted between inner and outer annular rings or rims and where the energy is transferred through the outer rim to an annular housing that retains the rotor, can be particularly successful in low head conditions, i.e., in slower currents.

Examples of open center, rim-mounted turbines can be seen U.S. Pat. No. 5,592,816 issued Jan. 14, 1997, and reissued as RE38,336 on Dec. 2, 2003, U.S. Pat. No. 6,648,589 issued Nov. 18, 2003, U.S. Pat. No. 6,729,840 issued May 4, 2004, and U.S. Patent Appl. Publication US2005/0031442 published Feb. 10, 2005 (Ser. No. 10/633,865). Examples of hydroelectric turbines used in low head (tidal flow) conditions can be seen in U.S. Pat. No. 4,421,990 to Heuss et al., U.S. Pat. Nos. 6,168,373 and 6,406,251 to Vauthier, UK Patent Appl. No. GB 2,408,294 to Susman et al., and WIPO International Publication WO 03/025385 to Davis et al.

Fluid powered turbines are seen as environmentally safe replacements for electrical power plants that utilize fossil fuels or atomic energy. In the harnessing of wind or water to produce electricity on a large scale capable of powering industrial complexes, towns, cities, etc., it is necessary to provide large numbers of turbines, and it is necessary that the turbines be as large as practical in order to maximize the amount of electricity produced by each turbine. The rotor blades of these turbines are multiple meters in length, with some experimental designs having blades exceeding 50 meters in length.

As the length of the rotor blades is increased, structural and manufacturing challenges are presented that are not encountered in smaller turbines or generators. For shaft-mounted turbines, it is difficult to provide long blades that are both strong and light. The rim-mounted turbines provide a solution to this problem by providing annular support to each end of the blade, with the outer support rim being retained within a housing having an annular slot or channel. For generation of electrical power, a large number of magnets are spaced along the annular support rim and a large number of coils are spaced along the receiving channel in the stator housing. The magnetic field established by the rotor field system passes across the gap that separates the rotor and the stator. Rotation of the rotor causes the magnetic flux linkage with the coils to change, inducing an electro-magnetic force in the coils.

In rim-mounted turbines, the weight of the rotor is borne by the lower half of the housing since there is no central supporting shaft or axle. For large turbines this load and the resulting friction effects can be significant, both as to initial start-up of the rotor within the housing and in the overall efficiency of the turbine once rotation has been achieved. Increased rotor weight means increased resistance to rotation, meaning that greater fluid flow is required to overcome the inherent inertia and friction. This is a particular problem for hydroelectric turbines used in low head conditions.

It is an object of this invention to provide an improved structure for a hydroelectric turbine wherein the weight of the rotor is reduced such that the rotor is buoyant. It is a further object to provide such a turbine wherein the reduction in weight is accomplished by providing buoyancy chambers in the rotor, such that for turbines submerged in water the negative gravity effects resulting from the large weight of the rotor are reduced or countered by the increased buoyancy of the rotor.

SUMMARY OF THE INVENTION

The invention is an improved fluid powered turbine of the type wherein the rotor blades are supported by an outer rim and the rim is maintained within or received by a housing having a channel to receive the outer rim. In a typical construction, the turbine is a generator in that magnets are disposed on the rotor outer rim and coils are disposed in the housing or stator channel, such that rotation of the rotor within the stator produces electricity. In particular, the turbine is of the type that is submerged in a body of water.

The improvement comprises providing a buoyant rotor within the housing. In a preferred embodiment, the rotor of the turbine is provided with one or more buoyancy chambers, located in the annular outer rim and/or the inner rim and/or the blades, such that the overall weight of the rotor is reduced and further such that the buoyancy of the rotor is increased. The chambers may be filled with air, other gases, liquids, foams, solids or any material possessing a specific gravity of one or less. The buoyancy chambers may be filled with polymer foam to add structural integrity and rigidity to the rotor.

DETAILED DESCRIPTION OF THE INVENTION

Figure 1:
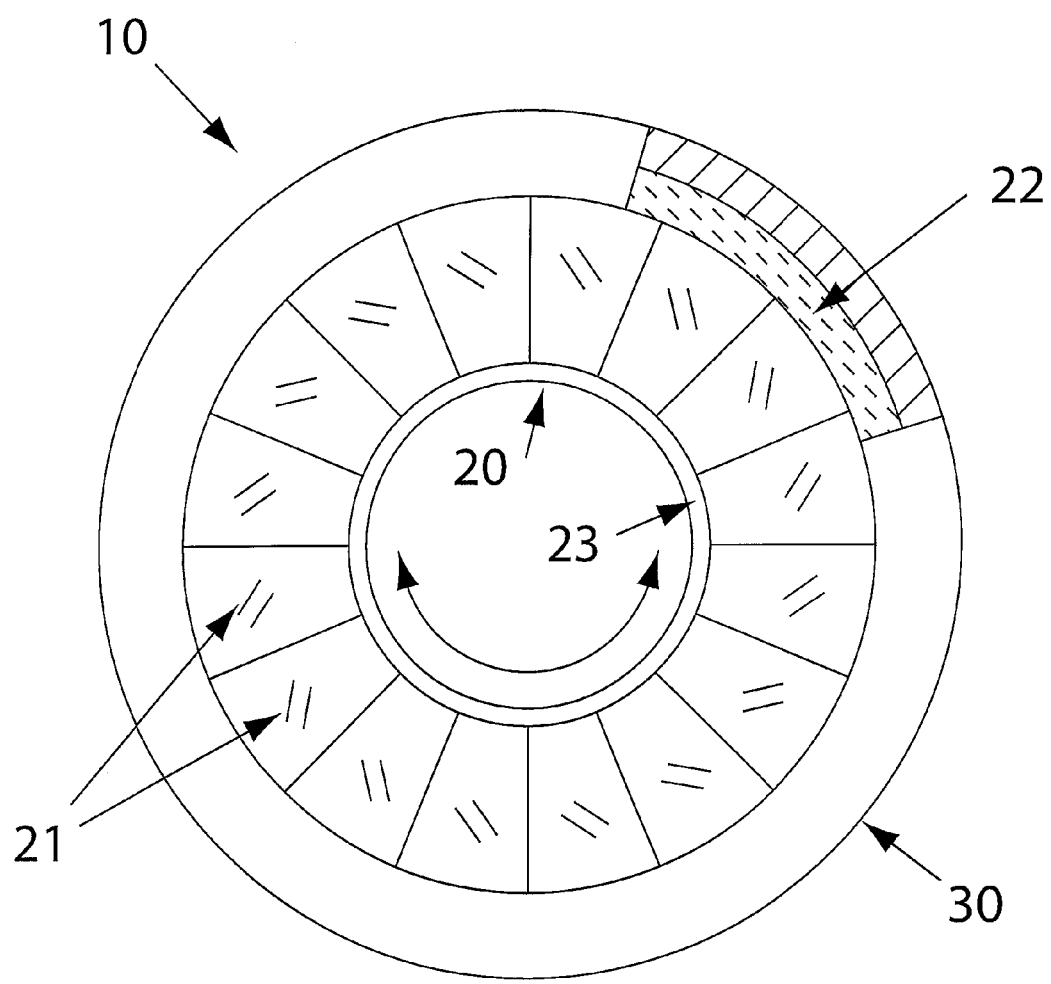
FIG. 1 is a view of a representative open-center, rim-mounted turbine, comprising a rotor having an outer rim and a stator housing having a channel to receive the rotor outer rim, as seen from the axial perspective.

With reference to the drawings, the invention will now be described in detail with regard for the best mode and the preferred embodiment. In a most general sense, the invention is a hydroelectric turbine of a type submerged in a body of water, the turbine comprising a rotor mounted within a stator housing, the rotor having an annular outer rim that is received and retained by an annular channel or slot in the stator housing, wherein the rotor is constructed so as to be buoyant. The generator means shown comprises the combination of a large number of magnets disposed on the rotor annular rim and a large number of coils disposed on the interior of the stator housing, preferably within the channel that receives the rotor annular rim, although other generator means may be utilized. For purposes of illustration, the turbine is shown in the drawings as an open-center, rim-mounted rotor, such that all support for the rotor is provided by the stator housing, but it is to be understood that the invention also applies to a turbine having a shaft-mounted rotor with an outer annular rim. As used herein, the term "buoyant" is intended to mean that the described element does not sink in the type of water in which the element is submerged, whether fresh water or salt water. Reference herein to the scientific definition for "buoyancy" as having a specific gravity less than or equal to one shall be taken herein to include expansion of this range to account for situations wherein the density of the water differs from that of pure water.

Figure 2:
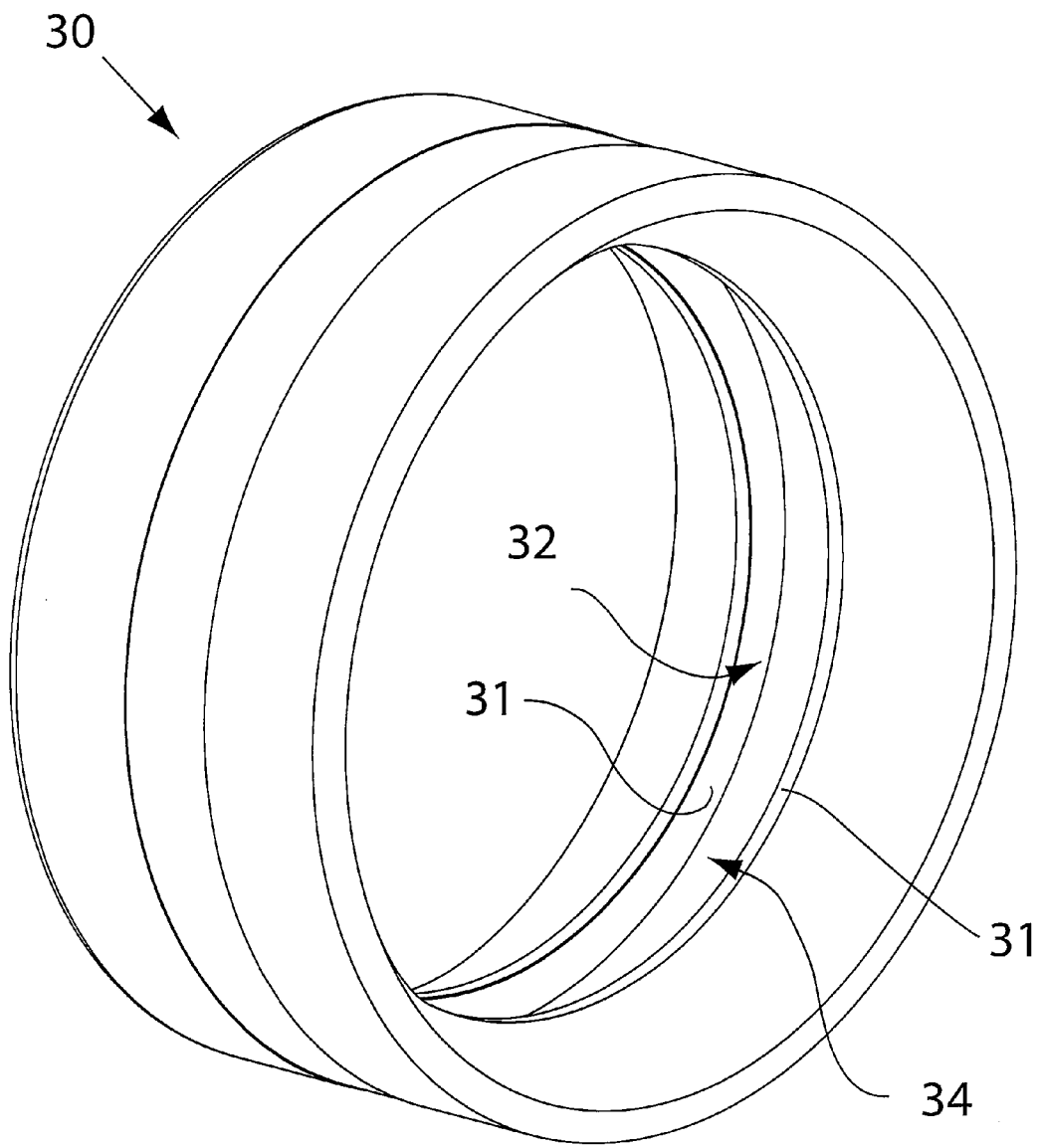
FIG. 2 is a perspective view of the stator housing.
Figure 3:
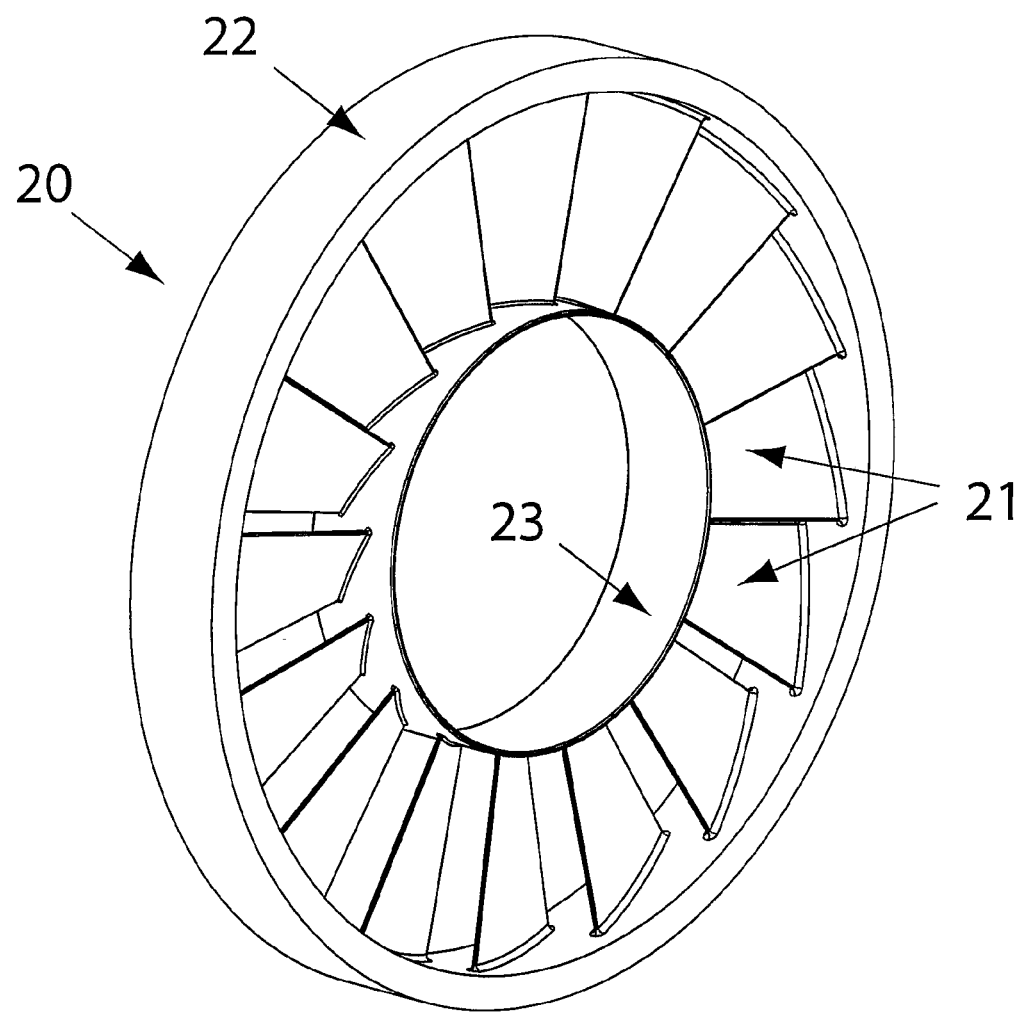
FIG. 3 is a perspective view of the rotor.

As shown generally in FIGS. 1 through 3, the invention is a turbine or power plant 10 comprising a generally annular stator housing 30. The configuration of housing 30 shown is not meant to be limiting, as other configurations are possible provided the housing 30 accomplishes among other purposes the retaining of the rotating assembly or rotor 20 against undesired movement in either axial direction and the allowing of rotation of the rotor 20 about the rotational axis. Housing 30 comprises a pair of retaining flanges 31 that define a channel 32 to receive and retain the rotor 20.

The rotating assembly or rotor 20 comprises an inner annular rim member 23 and an outer annular rim member 22. Extending between inner rim 23 and outer rim 22 are a plurality of props, runners or blade members 21, the blades 21 being angled or twisted in known manner such that movement of fluid in the axial direction and through the stator housing 30 results in rotation of the rotor 20. The particular number, configuration and material composition of the blades 21 may vary, but preferably the blades 21 are constructed to be as lightweight as possible without excessively sacrificing structural integrity.

The housing 30 and rotor 20 in combination define a generator means for the production of electricity. This may be accomplished by locating a plurality of magnets 41 about the outer periphery of the outer rim 22 and locating a plurality of coils 42 about the inner periphery surface 34 of the housing 30 or housing channel 32, such that the housing 30 becomes the stator of a generator. Rotation of the rotor 20 passes the magnets 41 across the coils 42 and electricity is produced in known manner.

Because of the large size of the turbine 10, construction from relatively lightweight yet structurally strong materials is desirable. To this end, it has been found suitable to construct the turbine using polymers, epoxies, resins, reinforcing fibers and the like as the primary structural components in the rotor 20 and housing 30. Typically, the rotor 20 will be constructed primarily of the lightweight materials set fort above, such that the magnets 41 and other components can be embedded therein. The rotor 20 is constructed so as to be buoyant when submerged in water.

Figure 4:
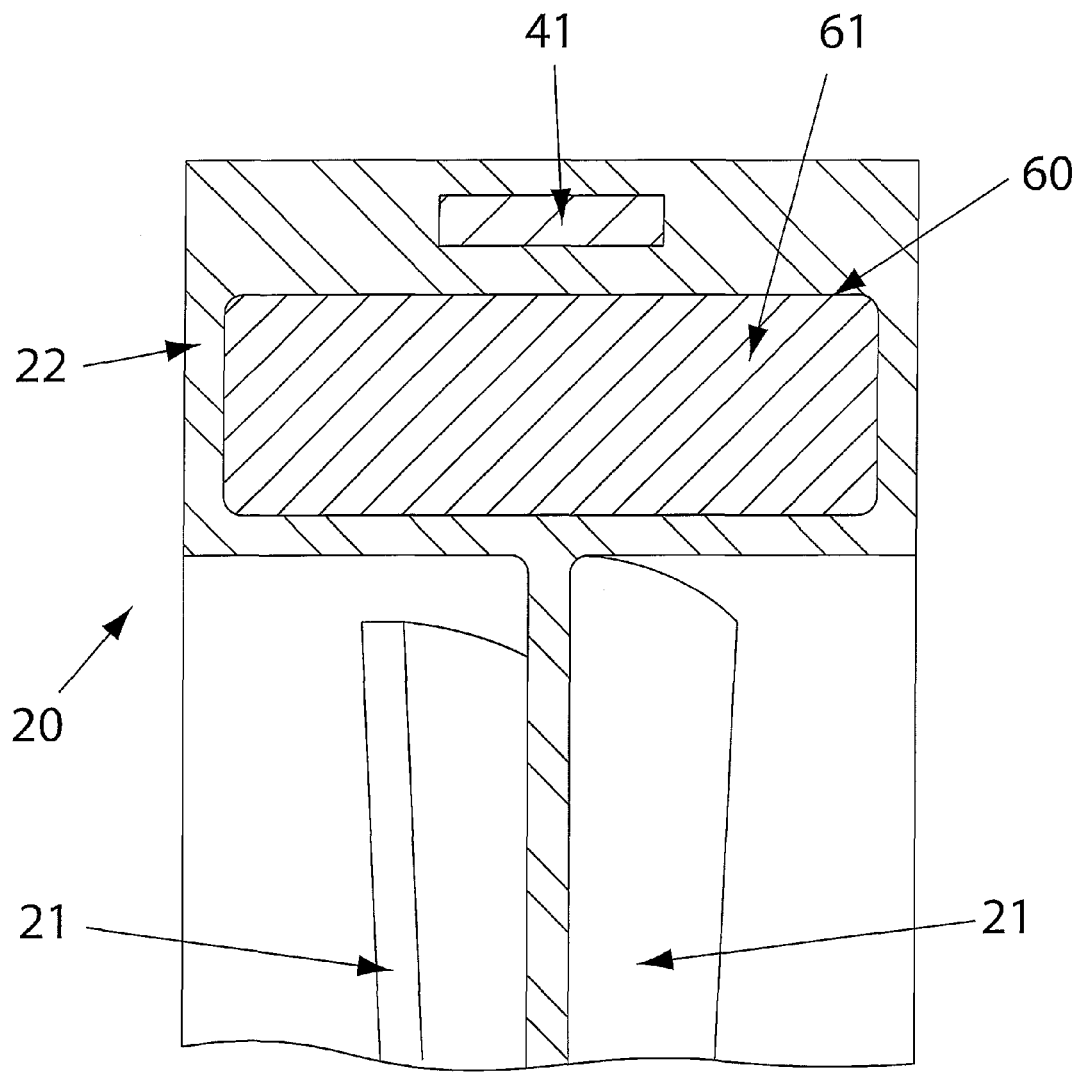
FIG. 4 is a partial cross-sectional view of the rotor annular outer rim.

In one embodiment, one or more buoyancy chambers 60 are disposed within the rotor 20, such as within the outer annular rim 22, as shown in FIG. 4. In a preferred embodiment a single annular chamber 60 extends completely about the outer annular rim 22, but multiple chambers 60 may be utilized in side-to-side or end-to-end relationship. If multiple chambers are utilized, they are balanced about the circumference such that the rotation of the rotor 20 is not adversely effected. Structural members, not shown, such as bracing members or the like, may be disposed within the buoyancy chambers 60 to increase the rigidity of the annular outer rim 22. The buoyancy chambers 60 may be filled with air or another gas, a liquid or lightweight rigid members or material having a specific gravity of one or less, but most preferably the chambers 60 are filled with a buoyancy material 61 possessing positive structural characteristics, such as a polymer foam. The polymer foam, such as a polyurethane for example, is pre-formed and positioned within the chamber 60 or is injected into the buoyancy chamber 60, and the latter is preferably of the type that will bond to the internal surface of the chamber 60 upon curing. The rigidity of the foam and its bonded interface with the walls of the buoyancy chamber 60 increases the overall rigidity and structural integrity of the rotor 20. The size of the buoyancy chambers 60 and the particular buoyancy material 61 are chosen to impart the desired degree of buoyancy for particular conditions. For example, in certain circumstances it may be desirable to merely lighten the rotor 20, while in other circumstances it may be preferable to reduce the weight of the rotor 20 to the point that it is neutral in terms of buoyancy, while in still other circumstances it may be preferable to reduce the weight of the rotor 20 to point that the rotor has positive buoyancy relative to the water, such that it floats above the stator channel 32 and any friction effects occur over the upper portion of the channel 32.

Figure 6:
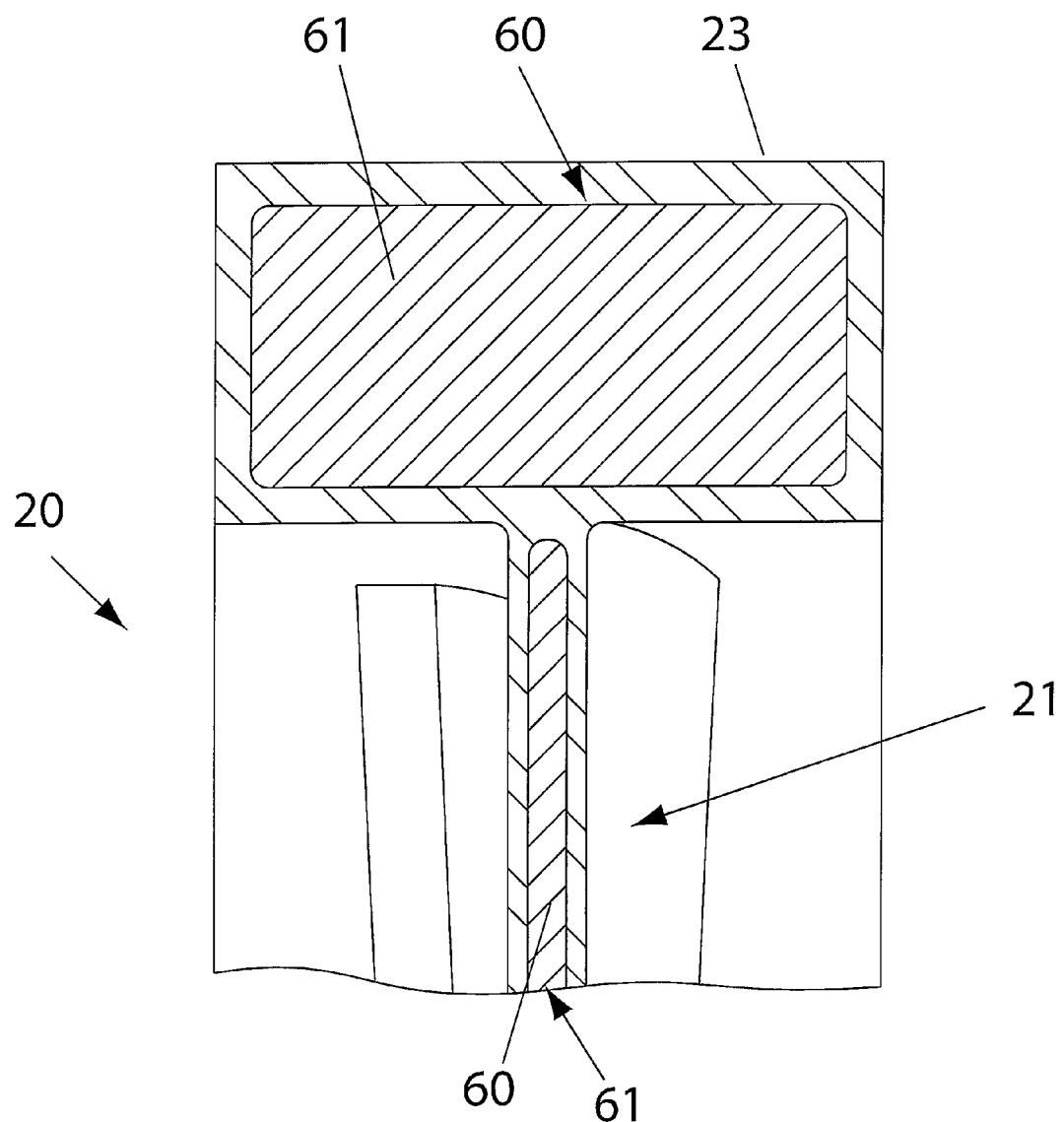
FIG. 6 is a partial cross-sectional view of the rotor annular inner rim.

Alternatively or in addition to the buoyancy chambers 60 provided in the annular outer rim 22, buoyancy chambers 60 may be disposed within the annular inner rim 23 and/or the blades 21, as shown in FIG. 6. As discussed above, the buoyancy chambers 60 of the annular inner rim 23 and the blades 21 may be filled with air or another gas, a liquid or lightweight rigid members or material having a specific gravity of one or less, but most preferably the chambers 60 are filled with a buoyancy material 61 possessing positive structural characteristics, such as polymer foam.

In this manner the negative friction effects occurring between the rotor 20 and the stator housing 30 resulting from the significant weight of the rotor 20 are reduced or eliminated, such that initial start-up is accomplished more easily and rotational efficiency is increased.

Figure 5:
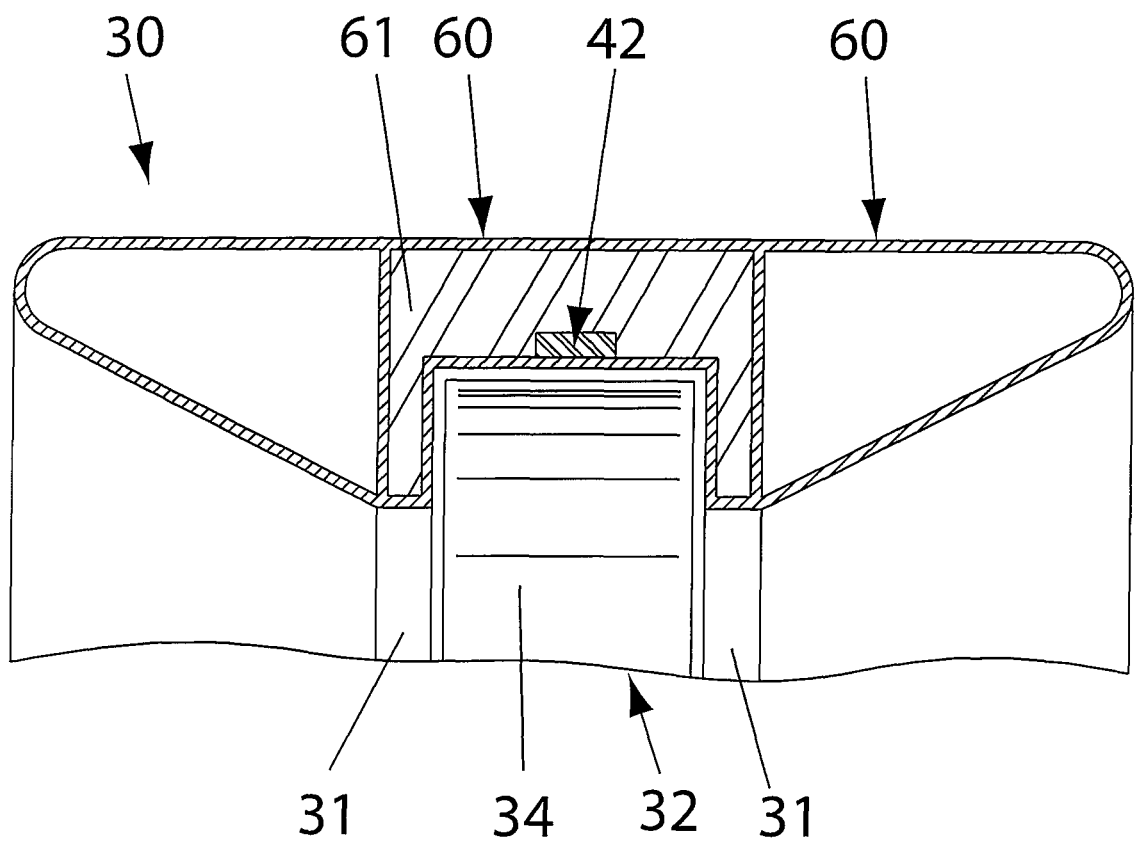
FIG. 5 is partial cross-sectional view of the stator housing.

In certain circumstances it may also be desirable to reduce the weight of the stator housing 30, such as when a floating turbine is desired. As shown in FIG. 5, one or more buoyancy chambers 60 may be disposed within the stator housing 30, the buoyancy chambers 60 being filled with a buoyancy filler material 61, such as a cured-in-place polymer foam or any other materials as described above, and preferably one that provides rigidity and structural integrity to the housing 60. Since the stator housing 30 is a stationary component of the turbine 10, the buoyancy chambers 60 are most preferably disposed in the top portion of the stator housing 30 in order to increase the stability of the turbine 10 in the water.

It is to be understood that equivalents and substitutions for certain elements set forth above may be obvious to those skilled in the art, and therefore the true scope and definition of the invention is to be as set forth in the following claims.

The invention claimed is:

1. A fluid powered turbine of the type submerged in water, said turbine comprising a rotor, a stator housing receiving said rotor, and generator means to produce electricity, and wherein said rotor comprises an outer rim positioned on blades, and wherein one or more buoyancy chambers are disposed in said outer rim.

2. The turbine of claim 1, wherein one or more said buoyancy chambers are disposed in said blades.

3. The turbine of claim 2, wherein said rotor comprises an inner rim disposed on said blades, and wherein one or more said buoyancy chambers are disposed in said inner rim.

4. The turbine of claim 1, wherein said rotor comprises an inner rim disposed on said blades, and wherein one or more said buoyancy chambers are disposed in said inner rim.

5. The turbine of claim 4, further comprising buoyancy filler material disposed within said one or more buoyancy chambers.

6. The turbine of claim 1, further comprising buoyancy filler material disposed within said one or more buoyancy chambers.

7. The turbine of claim 6, wherein said buoyancy filler material has a specific gravity of one or less.

8. The turbine of claim 7, wherein said buoyancy filler material comprises a gas.

9. The turbine of claim 7, wherein said buoyancy filler material comprises polymer foam.

10. The turbine of claim 6, wherein said buoyancy filler material comprises a gas.

11. The turbine of claim 6, wherein said buoyancy filler material comprises polymer foam.

12. The turbine of claim 1, wherein said one or more buoyancy chambers extend completely about said rotor.

13. The turbine of claim 1, wherein said one or more buoyancy chambers comprise multiple chambers in side-to-side relationship.

14. The turbine of claim 1, wherein said one or more buoyancy chambers comprise multiple chambers in end-to-end relationship.

* * * * *